United States Patent [19]

Henderson et al.

[11] Patent Number: 5,542,090
[45] Date of Patent: Jul. 30, 1996

[54] TEXT RETRIEVAL METHOD AND SYSTEM USING SIGNATURE OF NEARBY WORDS

[75] Inventors: Richard D. Henderson, San Jose; Michael J. Barbarino, Moss Beach, both of Calif.

[73] Assignee: Xerox Corporation, Stamford, Conn.

[21] Appl. No.: 280,963

[22] Filed: Jul. 27, 1994

Related U.S. Application Data

[63] Continuation-in-part of Ser. No. 988,537, Dec. 10, 1992, abandoned.

[51] Int. Cl.$^6$ .................................................. G06F 17/30
[52] U.S. Cl. .................... 395/600; 364/DIG. 1; 364/282.1; 364/282.3
[58] Field of Search ............................................ 395/600

[56] References Cited

U.S. PATENT DOCUMENTS

| | | | |
|---|---|---|---|
| 4,318,184 | 3/1982 | Millett et al. | 395/600 |
| 4,358,824 | 11/1982 | Glickman et al. | 364/419.19 |
| 4,554,631 | 11/1985 | Reddington | 364/283.2 |
| 4,823,306 | 4/1989 | Barbic et al. | 395/600 |
| 4,991,087 | 2/1991 | Burkowski et al. | 395/600 |
| 5,129,082 | 7/1992 | Tirfing et al. | 395/600 |
| 5,201,048 | 4/1993 | Coulter et al. | 395/600 |
| 5,265,065 | 11/1993 | Turtle | 395/600 |
| 5,317,507 | 5/1994 | Gallant | 364/419.13 |
| 5,319,779 | 6/1994 | Chang et al. | 395/600 |
| 5,325,298 | 6/1994 | Gallant | 364/419.19 |
| 5,367,672 | 11/1994 | Takagi | 395/600 |
| 5,465,353 | 11/1995 | Hull et al. | 395/600 |

OTHER PUBLICATIONS

Bertino et al, "An Evaluation of Text Access Methods", PROC of the Twenty–Second Annual Hawaii International Conference on System Sciences, 3–6 Jan. 1989, pp. 810–819 vol. 2.

Lee et al, "A Partitioned Signature for Multiattribute and Text Retrieval", PROC Sixth International Conference on Data Engineering, 5–9 FEB 1990, pp. 389–396.

*Primary Examiner*—Wayne Amsbury
*Attorney, Agent, or Firm*—Oliff & Berridge

[57] ABSTRACT

A method for searching a document corpus for query terms includes generating a list of document terms including a term signature for each term based upon characteristics of a number of adjacent terms. The term signatures can be generated by generating a bit vector for each term within a predetermined adjacent number of terms from each document term, such as through application of a hash function. The bit vectors can then be combined to form the term signature. The word signature alternatively can be generated using one or more morphological properties of the terms. The predetermined adjacent number of terms can be the number of search terms minus one, and may precede, follow, or both precede and follow the document term for which the term signature is generated. A search signature is generated for the query terms excluding a reference term, based upon the predetermined characteristics. The term signature of the reference term is compared with the search signature, and an indication is provided when the term signature of the reference term and the search signature match.

34 Claims, 2 Drawing Sheets

TEXT RETRIEVAL METHOD AND SYSTEM USING SIGNATURE OF NEARBY WORDS

This is a Continuation-in-Part of application Ser. No. 07/988,537, filed Dec. 10, 1992, abandoned.

BACKGROUND OF THE INVENTION

1. Field of the Invention

This invention relates to improvements in text retrieval systems. More particularly, this invention relates to a text retrieval systems for retrieving a document based on a comparison of the signature of a word in the text and the signature of a query term.

2. Description of Related Art

Considerable interest has been devoted to improving text retrieval systems. Text retrieval systems generally provide location information of individual words within the documents collected in the set or corpus of documents. The location information is generally kept in an inverted index. The location information can be, for example, a word offset from the beginning of the document by the number of words from the beginning at which the word is located. The location may contain, for example, an offset from a beginning of a section, paragraph, section number, sentence number, or other such location indicating index.

In the case of a combined image and text system the location information can be a page number with x,y coordinates and a height and length. This information serves two purposes. It makes more efficient searches where there is a constraint or value associated with the proximity of two or more terms to each other. Without the proximity information in the index, the text document would have to be examined from the beginning to find where in the document the two words occurred. The other purpose is to facilitate providing feedback to the user on why a particular document was selected by a search. A small segment of the document might be shown to the user perhaps with the terms highlighted that caused the document to be selected. The location information may make it possible to display and highlight the relevant text without reading the whole document.

Location information can be one of the largest components of an inverted index. However, it is often desirable in text retrieval systems to keep the index overhead to a minimum. The computation involved in merging possibly long lists of location information can be extensive. The present invention presents a technique which decreases the computation necessary to do proximity search while not increasing the indexing overhead wantonly.

SUMMARY OF THE INVENTION

In light of the above, it is, therefore, an object of the invention to provide an improved text retrieval system.

It is another object of the invention to provide an improved text retrieval system of the type described that enables efficient determination that one or more words occur a document.

It is another object of the invention to provide an improved text retrieval system of the type described that enables a user to be provided with information as to why a particular document was selected in the text retrieval process.

It is another object of the invention to provide an improved text retrieval system of the type described that can efficiently verify the proximity of more than one word without re-initiating a search for each word desired to be found.

It is yet another object of the invention to provide an improved text retrieval system that enables improved or minimized inverted index operation and construction.

It is yet another object of the invention to provide an improved text retrieval system of the type described that enables a minimum index overhead.

It is yet another object of the invention to provide an improved text retrieval system of the type described that decreases the computation necessary to do proximity searching without increasing significantly the indexing overhead.

It is another object of the invention to provide an improved method for performing proximity queries to locate two or more words in proximity to each other within a document or corpus of documents.

These and other objects, features and advantages of the invention will be apparent to those skilled in the art from the following detailed description of the invention, when read in conjunction with the accompanying drawings and appended claims.

In accordance with a broad aspect of the invention, a method for searching for a number of query terms in a document corpus includes generating an index of terms in the document corpus that includes a term signature for each term based upon predetermined characteristics of a number of adjacent terms. A search signature is generated for the query terms excluding a reference term based upon the predetermined characteristics, and the index is searched for a term signature of the reference term. The term signature of the reference term is compared with the search signature, and an indication is provided when the term signature of the reference term and the search signature match.

The term signature for each term in the document corpus can be generated by generating a bit vector for terms within a predetermined adjacent number of terms for each term in the document corpus. The generated bit vectors can then be combined to form the term signature. The predetermined adjacent number of terms can be the number of search terms minus 1, and may precede, follow, or both precede and follow the term for which the term signature is generated.

In one embodiment, the bit vector for each adjacent term is generated by a hash function, which also can map each term within the document in which the term appears. The terms can be words, language characters, Kanji characters, or the like, and the word signature alternatively can be generated using one or more morphological properties of the terms.

BRIEF DESCRIPTION OF THE DRAWINGS

For a better understanding of the invention and further features thereof, reference is made to the following detailed description of the invention to be read in connection with the accompanying drawings, wherein.

DETAILED DESCRIPTION OF THE PREFERRED EMBODIMENTS

While this invention is described in some detail herein, with specific reference to illustrated embodiments, it is to be understood that there is no intent to be limited to these embodiments. On the contrary, the aim is to cover all the modifications, alternatives and equivalents falling within the spirit and scope of the invention as defined by the claims.

Figure 1:
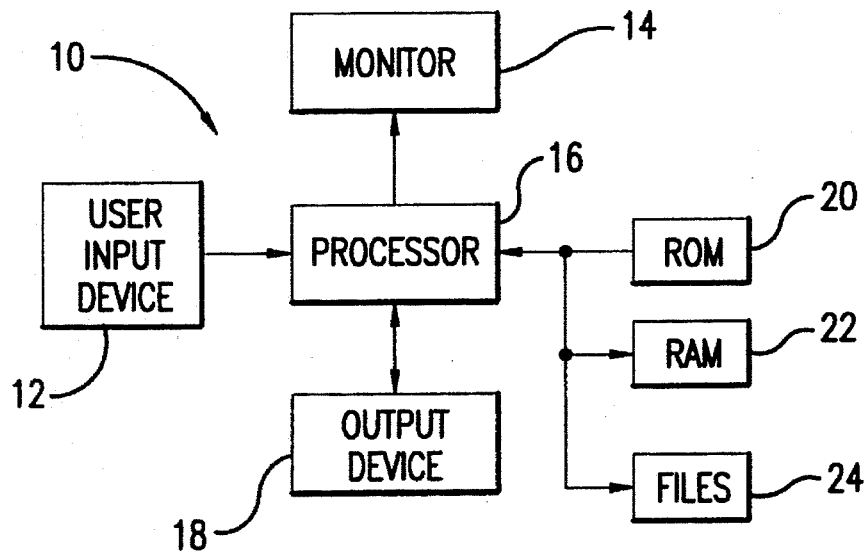
FIG. 1 is a block diagram of an apparatus for retrieving relevant documents by comparing an index word signature of the document with a query signature.

FIG. 1 is a block diagram of a preferred embodiment according to the invention of an apparatus 10 for retrieving relevant documents based on the signature of the words in the documents and the query. The apparatus 10 includes a user input device 12 which includes, for example, one or more of an image scanner (optical or electronic), a keyboard, a touch screen, a mouse, etc. The image scanner can be a stand-alone device, or part of a facsimile machine or document reproducing machine (copier).

A processor 16 is connected to the input device 12 for generating and comparing index word signatures of the documents with query signatures of the search query. Processor 16 operates to perform these functions in accordance with operating programs read from read only memory (ROM) 20, and by using random access memory (RAM) 22. Documents can be stored or retrieved from files 24.

Processing results and user input information can be monitored on a CRT display monitor 14. After processor 16 has completed processing the documents, the results can be output to an output device 18, which includes, for example, a storage means (hard or floppy disk), a printer, a photocopier, a facsimile machine or a CRT display.

In accordance with the invention, an approach to proximity queries is disclosed that uses a "signature" of nearby words, obtained, for example, by hashing, as location information. The method of this invention presents an alternative method for performing proximity searches from present techniques that typically use lists of word occurrence in documents. The method by which the invention accomplishes proximity searches is through use of an inverted index used for text search in which a hash value generated by the neighboring words is stored, in lieu of storing direct location information. This is done by applying a hash function to each of the words near particular words, then combining the results in an index. The method has broad applications, one of which, for example, is to process information from a CD-ROM, or other large data base.

The method of the invention can be alternatively performed, for example, by using parameterized word shapes, rather than words for which a character-based representation is necessary, and, in addition, can be used on images that contain symbols that are hashable for languages with "pictorial" symbols, such as Kanji, Katakana, Hiragana, or the like. Although the method described herein is directed to a method of evaluating the signatures of words based upon a summation of values assigned to individual adjacent words, it will be appreciated that the invention can be practiced by noting and evaluating the word order in which the adjacent words may appear, for increased accuracy of proximity inquiries and text retrieval.

More particularly, a hash value generated by the neighboring words is stored. This is done by applying a hash function to each of the words near the word being indexed. The results of the hash function are then combined together. This saves time during proximity search since it avoids merging multiple lists of location information. Instead, the shortest of several lists is compared to the hash value for the query phrase.

Figure 2:
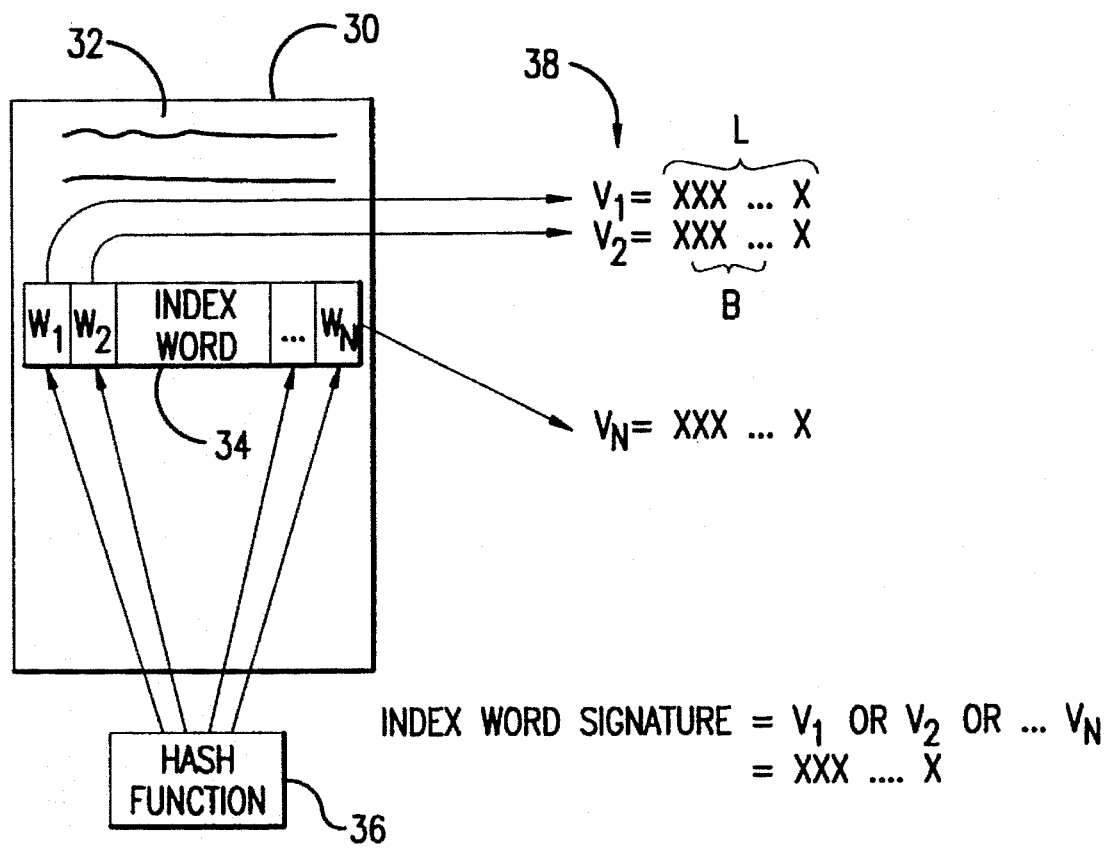
FIG. 2 is a diagram of the method for generating word signatures from individual word vectors, in accordance with a preferred embodiment of the invention.

The process of generating a signature for each term in a text is diagrammatically shown in FIG. 2. First, an index word is selected. The index word can be any word in the document, but usually is an uncommon word. For example, common words are words such as: the, by, and with. A word vector is generated for each word within "N" words of the index word in the text 32 of a document 30. The number "N" can be determined to be any arbitrary value; however, it will be appreciated that the larger the number of words that are used in the formation of the signature of the index words, the better the accuracy of the search that can be implemented.

A typical text retrieval system will delete common words from the text to increase the efficiency of the search. The text retrieval system can also perform a stemming process on the remaining words. For example, the word "advanced" will be reduced to the root word "advance." However, the method of the invention will function without performing the stemming process or the removal of the common words.

In FIG. 2, the adjacent words surrounding the index word 34 are shown as words: $W_1, W_2, \ldots W_N$. Each of the adjacent words are processed with a hash function 36 to generate a word vector 38. For example, word vector $V_1$ corresponds to word $W_1$. It is not necessary to apply the hash function to the index word itself. According to this technique, it will be appreciated that the word vectors, $V_1, V_2, \ldots V_N$, that form the signature of the index word 34 are each dependent upon a number of words adjacent the respective words that form the signature.

Each word vector has a length "L" number of bits to represent the word. The number L can be any number that accommodates the information of the resulting hash function. A preferred embodiment may use word vectors that have 128 bits. The hash function sets "B" number of bits in the word vector. The location and number of bits set may change depending on the specific word being processed by the hash function. Therefore, two different words may set a different number and different location of bits (the set bits do not have to be adjacent). However, the same word will set the same location and number of bits whenever the hash function is applied.

In the embodiment of FIG. 2, the adjacent words precede and succeed the index word 34. However, it is also possible to select the distribution of the adjacent words around the index word to be only preceding adjacent words or only succeeding adjacent words. There are different advantages to taking words on both sides of an index word and taking only words before or only words after the index word. The selection of the location of the adjacent words may be important when searching for phrases, such as "computer processing systems."

The various parameters, "L", "B" and "N" should be selected so that the bit vector "L" is well mixed between 0's and 1's, thus packing the most information into the word vector. The larger the bit vector "L", the greater the indexing overhead, but fewer false positives will be encountered. Within the bounds of the constraint on "L", "B", and "N" to keep the bit vector full of information, a larger "B" gives the hash function a greater range and decreases the number of false positives. However, a smaller "B" makes a smaller "L" or a larger "N" possible.

When "N" is small, there is less of a need to make "L" larger or "B" smaller; but "N" limits the number of words within the proximity of the query words. For example, a query seeking a first word within six words of a second word cannot be served efficiently if the number of adjacent words in the index word signature is four (N=4). Furthermore, a large "N" increases the chances of false positives where the word is within "N" but outside the requested range.

The hash function should have good hash characteristics such as covering the whole range more or less evenly for typical input. The occurrence of false positives may be reduced by selecting hash functions that have good hash characteristics.

To complete the formation of the signature of the index word, the "N" resulting word vectors are combined to produce the index word signature for that occurrence of the word being indexed. In the embodiment shown in FIG. 2, for example, the word vectors $V_1, V_2, \ldots V_N$ are combined by a logical OR function. Of course, other combination techniques can alternatively be used. The resulting bit vector, or index word signature, is then stored in a list associated with the index word. Each list entry contains the document identifier and at least one index word signature.

An alternative assignment of index word signatures can be adopted which reduces the necessary storage space. If one document contains several index word signatures for a specific index word, then the index word signatures can be combined together by using a combination function, for example, logical OR. Therefore, only one index word signature will be generated for an index word in a specific document.

After the index word signature for all of the words in the document 30 is generated, the next document is processed. After all of the documents are processed, a proximity search can be performed to determine if a predetermined number of search terms appear in one of the documents.

A proximity search inquiry is processed by generating a query signature for the query. The query can have the following format:

$$q_1, q_2, \ldots q_n, d \qquad (1)$$

where $q_1, q_2, \ldots$ and $q_n$ are query terms; and "d" is a number of words defining a range within which the query terms $q_1, q_2, \ldots$ and $q_n$ are sought to exist. Both "n" and "d" must be less than "N". Those skilled in the art will recognize that other formats for the search format can be equally advantageously employed.

To perform the search, any one of the query terms is selected to form the query signature. If possible, the query term that has the smallest number of occurrences in the corpus of documents should be selected. For example, if query word $q_1$ is selected, then the query signature is formed based on the query words adjacent to the selected query word $q_1$. A query word vector is generated for each query word by using the hash function. The query word vectors are combined to form the query signature.

The query signature is compared to the index word signatures, which have been stored with the corresponding index words. If all the bits set in the query signature are set in the index word signature, then that document contains a potential hit. The identification of the document can be added to a list of potentially relevant documents.

If the goal of the proximity search is only to list the documents that satisfy the proximity condition, then the next document is searched for a matching index word signature once a hit is found in the current document. The process is then repeated, until every document containing the index word has been searched.

After the matching process has been completed, a list of possibly relevant documents that have the desired combination of words close together is obtained. Depending on the demands of the application, the list of documents can be returned, or, if precision is particularly important, the documents can be examined further in order to weed out the false positives. In addition, the index word can be highlighted so that the user can easily locate the index word within the documents.

It will be appreciated that by using the method of the invention, it may be more difficult to provide feedback to the user to indicate query hits. While the bit vectors provide information more or less directly that a combination of words probably occurs in the document, the bit vector says little about where in the document the vector occurs. Thus, to provide user feedback, it may be necessary to go through the text in the same manner as in weeding out false positives.

Figure 3:
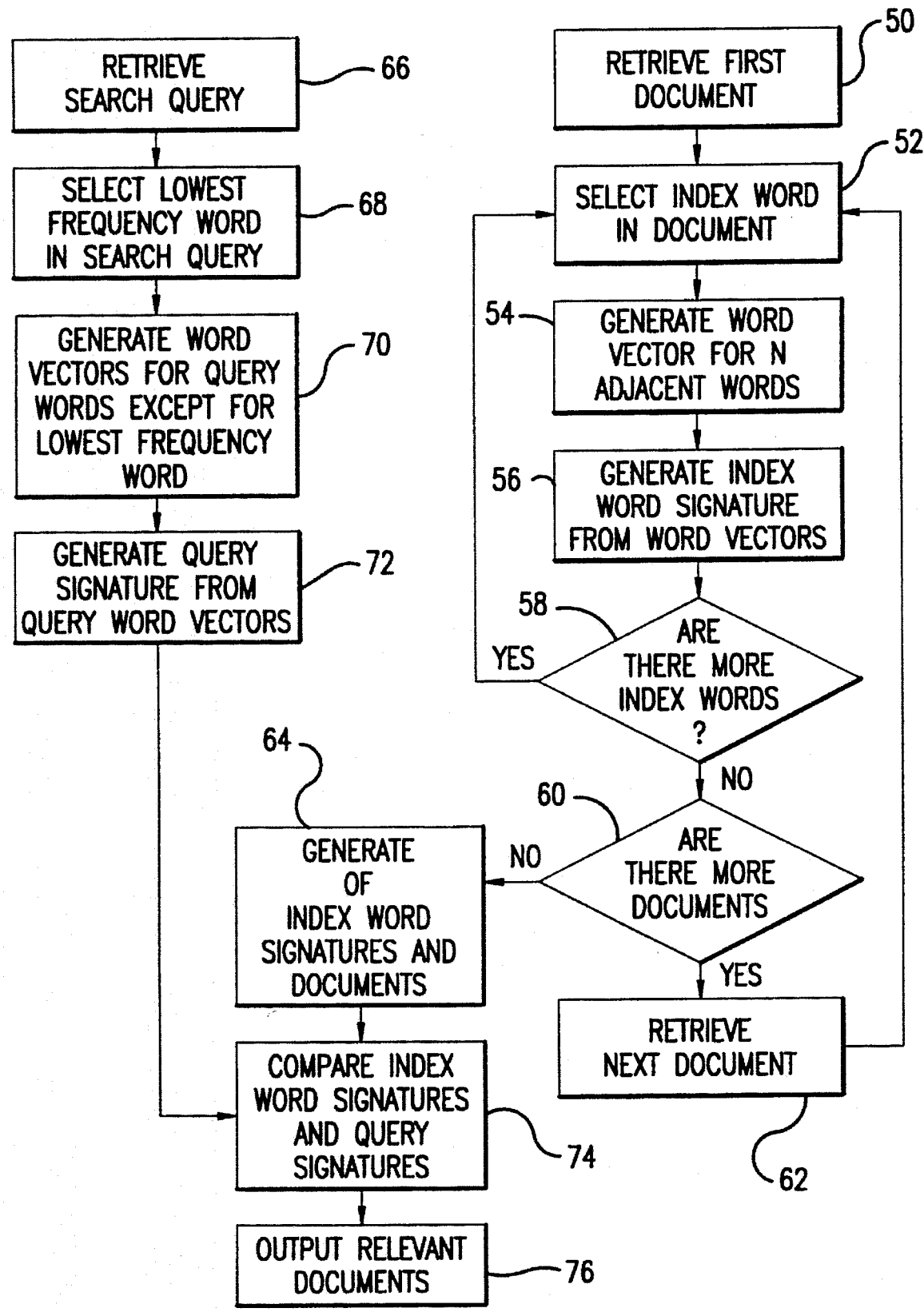
FIG. 3 is a flow diagram showing the various steps in the method for performing proximity queries, in accordance with a preferred embodiment of the invention.

The various steps for performing the proximity search are shown in FIG. 3. In step 50, the first document is retrieved. The common words may have been eliminated in the document and all of the remaining words are stored as their corresponding root word by a stemming process. The first index word in the document is selected in step 52.

The user has previously selected the number of adjacent words, the type of hash function and whether the adjacent words precede, succeed or surround the index word. Therefore, in step 54, the word vectors for the N adjacent words are generated by using the selected hash function.

In step 56, the index word signature is generated by combining the word vectors. In step 58, the first document is examined to determine if any index words have not been processed. If there are more index words to process, then flow returns to step 52 to select a new index word. If all of the index words are processed in the selected document, then flow continues to step 60.

If there are more documents to process, then flow continues to step 62 where the next document is retrieved. Then step 52 is executed to select the first index word in the next document. If all of the documents have been processed at step 60, then step 64 is executed to generate a list of index words and their corresponding index word signatures and documents.

After the user inputs a search query in step 66, the computer determines the lowest frequency word in the search query in step 68. The frequency of occurrence of each index word in the documents is counted and stored. Then each query word is analyzed to determine which query word occurs the least amount of times in the corpus of documents. In the alternative, the computer could randomly select the query word that the query signature is based on. Thus, eliminating the determination of the lowest frequency word.

In step 70, the query word vectors for the query words is generated excluding the query word with the lowest frequency of occurrence (or the randomly selected query word). The query signature is generated from the query word vectors in step 72.

In step 74, the query signature is compared to the index word signatures in the list, which was generated in step 64. If the query signature matches a signature for the index word signature, then the document is flagged as a possible relevant document. After all of the index word signatures are compared, then the relevant documents are output to the user in step 76. The index word in each document may be highlighted by the computer to assist the user in examining the retrieved documents.

The efficiency gain of this technique can be seen by comparing the order of the algorithms used in conventional proximity searching and the method of the invention. Assuming that there is only one index word signature for an index word in a document, then the number of comparisons made is:

$$O(\max(\min(C(q_i)), n*\log(U))) \qquad (2)$$

where O is the order of complexity of calculation; $C(q_1)$ is the corpus frequency of query word $q_1$; n is the number of words in the query; and U is the number of unique words in the corpus of documents.

The second term $n*\log(U)$ is the cost of looking up the corpus frequencies of all n words $q_i$. In the worst case for conventional proximity, every piece of location information must be examined at least once. When terms are in the range, they must be re-examined possibly as many as d times. So a lower bound on the order of conventional proximity search for the worst case is:

$$O(\text{Sum}(C(q_1)) + n*\log(U)) \qquad (3)$$

If one list has a much lower upper bound than another, the trailing terms of the upper list can be ignored. After comparing several lists, the resulting list of combined cases should usually be short. Therefore, the examination of the entire long list is unlikely.

An example of using the invention will now be described. The following sample sentences from three documents will be analyzed.

Document 1: Computer systems incorporate many new circuits that must be upgraded periodically. However, the building of circuit boards with low voltage devices is preferred.

Document 2: Advancements in integrated circuit technology are increasing at an exponential rate.

Document 3: The docket of the Petersburgh circuit court is increasing every month.

The number of adjacent words included in the index word signature is two words on either side of the index word (N=4). In this example, the hash function will generate and set between seven and ten bits of the word vector, which contains 128 bits. However, only eight bits of the 128 bit word vector will be shown and processed.

The computer will index the word "circuit" in each sentence after deleting common words and stemming the remaining words. Thus, the four adjacent words and their hash value will be:

| Doc.1: | 1st occ. | system      | ...00101000... |
|        |          | incorporate | ...00100100... |
|        |          | upgrade     | ...01100100... |
|        |          | periodic    | ...11001000... |
|        | 2nd occ. | however     | ...10001000... |
|        |          | build       | ...00010000... |
|        |          | board       | ...10001001... |
|        |          | low         | ...00011001... |
| Doc.2: | 1st occ. | advance     | ...10100000... |
|        |          | integrate   | ...10010001... |
|        |          | technology  | ...01000010... |
|        |          | increase    | ...01000001... |
| Doc.3: | 1st occ. | docket      | ...01001000... |
|        |          | petersburgh | ...00000001... |
|        |          | court       | ...01000000... |
|        |          | increase    | ...01000001... |

The word vector for the word "increase" is the same in documents 2 and 3. However, all of the word vectors for different words have different quantity and locations of bits set due to the characteristics of the hash function.

In this example, a logical OR is performed on the resulting word vectors in each sentence to form the index signature for each occurrence of the word "circuit."

In document 1, 1st occurrence:
=00101000 OR 00100100 OR 01100100 OR 11001000
=...11101100...
In document 1, 2nd occurrence:
=10001000 OR 00010000 OR 10001001 OR 00011001
=...10011001...
In document 2:
=10100000 OR 10010001 OR 01000010 OR 01000001
=...11110011...
In document 3:
=01001000 OR 00000001 OR 01000000 OR 01000001
=...01001001...

Therefore, the following index will be formed for the word circuit;

| Circuit: | Doc. 1 | ...11101100...,....10011001... |
|          | Doc. 2 | ...11110011...                 |
|          | Doc. 3 | ...01001001 ...                |

The index word signature assigned to document 1 could be further reduced by performing another logical OR process on the two index word signatures. Therefore, the final index word signature for document 1 would be ( . . . 11111101 . . . ).

The two Term query "integrated circuits" is used to find relevant documents. Assume that the word "integrated" has 450 hits and the word "circuits" has 250 hits in all of the documents. Therefore, the word "circuits" will be used to find the relevant documents because it appears fewer times in the documents than the word "integrated".

The signature of the query is determined by eliminating the word "circuit". After performing a hash function on the word "integrated," the query signature is . . . 10010001 . . . . The query signature is compared to the signatures of each document to locate documents that may possibly contain the query term.

Document 1 will be selected because the signature of the second occurrence of the word "circuit" matches the query signature. The first, fourth and eighth bits are set (1) in both the index word signature and the query signature. In the query, the non-set bits (0) are considered "don't cares." Therefore, the computer perceives this as a match. This is a false positive because the word "integrated" is not present in the sentence. The first occurrence of the word "circuit" does not match the query signature because the eighth bit of the index word signature is not set.

Document 2 is correctly selected. The first, fourth and eighth bits are set (1) in both the index word signature and the query signature. Thus, a sentence containing the word "integrate" has been correctly identified by the method.

Document 3 is not selected because the fourth bit is not set (1) in the index word signature. This is a correct action because document 3 is not relevant to the query.

The user may review each of the selected documents to determine which ones are useful. The computer may highlight the location of the word circuit in the document using typical techniques of searching for words and highlighting to assist the user.

If the query is "integrated circuit technology," then the three terms are analyzed. Assuming that circuit is again the least frequent word in the documents, then the query signature is . . . 11010011 . . . (integrate OR technology=. . . 10010001 . . . OR . . . 01000010 . . .=11010011 . . . ). Only document 2 is selected because it contains the only signature with the first, second, fourth, seventh and eighth bits set. The sentence contains all three words of the query. Therefore, the search has been successful.

Those skilled in the art will recognize that other ways for generating word signatures can be equally advantageously employed. For example word signatures based upon morphological properties of adjacent words can be generated and combined. One technique for defining morphological word properties, for example, is described in copending patent application Ser. No. 07/794,191, filed Nov. 19, 1991, said application being assigned to the assignee hereof, and incorporated herein by reference. The collection of morphological properties can then be combined, in any desired way; for example, if the morphological properties selected are the height and width of the words, a signature can be formed from summing the height and width of a predetermined number of words adjacent the index word in the manner described above. Other morphological characteristics include word contour characteristics, dimensions of the word, fonts, typeface, number of ascender elements, number of descender elements, pixel density, and pixel cross-sectional characteristics.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for retrieving relevant documents in a corpus of documents based on a search query, the method comprising the steps of:

storing the corpus of documents in a storage device;

inputting the corpus of documents and the search query on an input device;

generating an index term signature for each index term in the corpus of documents, the index term signature being based on a hash function of a predetermined number of adjacent terms adjacent to the index term;

generating a list containing the index terms in the corpus of documents, the list associating each index term with a document identifier and corresponding index term signatures occurring in the document;

generating a query signature for the search query excluding a reference term, the query signature being based on the hash function of the adjacent query terms adjacent to the reference term;

comparing the query signature to the index term signatures in the list to identify index term signatures that match the query signature, the reference term of the query signature being equivalent to a searched index term of the list; and outputting a document list indicating the documents that contain the identified index term signatures on an output device.

2. The method of claim 1, wherein the index term signatures are combined to form a single index term signature for each index term in the document.

3. The method of claim 1, wherein said step of generating the index term signature for each index term in the document corpus, comprises:

generating a term vector based on each adjacent term within the predetermined number of adjacent terms; and combining the generated term vectors to form the index term signature.

4. The method of claim 3, wherein the predetermined number of adjacent terms is at least equal to the number of search terms in the search query minus one.

5. The method of claim 3, wherein said predetermined number of adjacent terms precede the index term.

6. The method of claim 3, wherein said predetermined number of adjacent terms succeed the index term.

7. The method of claim 3, wherein said predetermined number of adjacent terms both precede and succeed the index term.

8. The method of claim 3, wherein said term vector for each adjacent term is generated by a hash function.

9. The method of claim 8, wherein the hash function is based on selected morphological characteristics of the terms.

10. The method of claim 9, wherein the selected morphological image characteristics include at least one of a dimension, font, typeface, number of ascender elements, number of descender elements, pixel cross-sectional characteristics, pixel density, and contour characteristic of said term.

11. The method of claim 8, wherein the hash function is based on the ASCII code of the letters in the term.

12. The method of claim 1, wherein said step of generating a query signature for the search query, comprises:

selecting a reference term in the search query;

generating a term vector for all terms within the search query except for the selected reference term; and combining the generated term vectors to form the query signature of the reference term.

13. The method of claim 1, wherein said terms in said document corpus are words.

14. The method of claim 13, wherein the index words are uncommon words.

15. The method of claim 1, wherein said terms in said document corpus are language characters.

16. The method of claim 15, wherein said language characters are one of Kanji, Katakana, Hiragana and pictorial characters.

17. An apparatus for retrieving relevant documents from a corpus of documents based on a search query, the apparatus comprising:

storage means for storing the corpus of documents;

input means for inputting the corpus of documents and the search query;

a controller for retrieving relevant documents from the corpus of documents, the controller comprising:

index term signature generating means for generating an index term signature for each index term in the corpus of documents, the index term signature being based on a hash function of a predetermined number of adjacent terms adjacent to the index term;

list generating means for generating a list containing the index terms in the corpus of documents, the list associating an index term with a document identifier and corresponding index term signatures occurring in the document;

query signature generating means for generating a query signature for the search query excluding a reference term, the query signature being based on the hash function of the adjacent query terms adjacent to the reference term; and comparing means for comparing the query signature to the index term signatures in the list to identify index term signatures that match the query signature of the reference term, the reference term of the query signature being equivalent to the index term of the list; and output means for outputting a document list indicating the documents that contain the identified index term signatures.

18. The apparatus of claim 17, wherein the index term signatures are combined to form a single index term signature for each index term in the document.

19. The apparatus of claim 17, wherein the storage means is one of a ROM and an external storage device.

20. The apparatus of claim 17, wherein the input means is one of a keyboard, a touchscreen, an image scanner and a computer terminal.

21. The apparatus of claim 17, wherein the output means is one of a CRT display, a storage means, a photocopier, a facsimile machine and a printer.

22. The apparatus of claim 17, wherein the index term signature generating means further comprises:

term vector generating means for generating a term vector based on each adjacent term within the predetermined number of adjacent terms; and combining means for combining the generated term vectors to form the index term signature.

23. The apparatus of claim 22, wherein the predetermined number of adjacent terms is at least equal to the number of search terms in the search query minus one.

24. The apparatus of claim 22, wherein said predetermined number of adjacent terms precede the index term.

25. The apparatus of claim 22, wherein said predetermined number of adjacent terms succeed the index term.

26. The apparatus of claim 22, wherein said predetermined number of adjacent terms both precede and succeed the index term.

27. The apparatus of claim 22, wherein said term vector for each adjacent term is generated by a hash function.

28. The apparatus of claim 27, wherein the hash function is based on morphological characteristics of the terms.

29. The apparatus of claim 27, wherein the hash function maps a location of each term within the document.

30. The apparatus of claim 17, wherein the term signature generating means comprises:

selecting means for selecting a reference term in the search query;

term vector generating means for generating a term vector for all terms within the search query except for the selected reference term; and combining means for combining the generated term vectors to form the query signature of the reference term.

31. The apparatus of claim 17, wherein said terms in said document corpus are words.

32. The apparatus of claim 31, wherein the index words are uncommon words.

33. The apparatus of claim 17, wherein said terms in said document corpus are language characters.

34. The apparatus of claim 33, wherein said language characters are one of Kanji, Katakana, Hiragana and pictorial characters.

* * * * *